Patented Aug. 25, 1936

2,051,846

UNITED STATES PATENT OFFICE 2,051,846

PRODUCTION OF BARBITURIC ACID

Paul Halbig and Felix Kaufler, Munich, Germany, assignors to Dr. Alexander Wacker Gesellschaft fur Elektrochemische Industrie, G. m. b. H., Munich, Germany, a corporation No Drawing. Application August 19, 1933, Serial No. 685,960. In Germany September 21, 1932

4 Claims. (Cl. 260—33)

The object of the invention is the production of barbituric acids by condensation of malonic esters and urea by means of alkali alcoholates. This condensation has been carried out hitherto by heating the ethyl or methyl esters and urea in alcoholic solution with an alcoholate. It was necessary to boil for several hours in order to complete the reaction or even to work under a pressure of several atmospheres in order to obtain higher temperatures. From the thus obtained suspension or solution of barbiturate in alcohol, the barbituric acids were obtained, together with all other substances not evaporated during the distillation of the alcohol, by the addition of water and mineral acid after the distillation of the alcohol.

It has been found that a number of technological advantages are produced, when alcoholates of alcohols with more than 3 atoms of carbon are used for this condensation. Thereby, the duration of the reaction can be reduced to a fraction of the time hitherto necessary, without the use of pressure. The isolation of the barbiturate can be carried out by shaking with water in consequence of the insolubility of the alcohols, whereby the desired barbiturates are obtained with increased purity. Unconverted esters can be easily recovered as residue by distilling the alcohol solution after washing with water. The dehydrating of the alcohol is very simple in consequence of the low solubility of the alcohol in water.

In carrying out the reaction it is not absolutely necessary to previously produce the esters of the respective higher alcohols. It is possible, for instance, to have the ethyl esters react with sodium butylate and urea in a solution of butanol; under the catalytic influence of the alcoholate, the ethyl esters are esterified with butanol; the ethyl alcohol can be easily distilled off. The same holds true with regard to the alcoholates, which can also be obtained by the displacing method.

Example 1

46 grams of metallic sodium are dissolved in 1200 cubic centimeters of absolute butanol; 120 grams urea and 216 grams malonic acid dibutyl ester are added. This mixture is heated to 100° C. for thirty minutes, and then to the boiling point for a quarter of an hour. Cooling water is then added to dissolve the product, and the solution is allowed to settle. The upper layer of butanol is separated and washed several times with a little water. The watery layer, together with the washing waters, is acidified with hydrochloric acid, is heated to the boiling point for removing small amounts of alcohol, and cooled. During the cooling, the barbituric acid crystallizes out in a pure condition. 111 grams of acid were recovered giving a yield of 87% of theory.

Example 2

70 grams urea and 272 grams diethyl-malonic acid dibutyl ester are added to a solution of 192 grams sodium butylate in 900 cubic centimeters butanol, then this is heated for half an hour to 100° C. and to the boiling point for a short period. After cooling, the precipitate is dissolved with 700 cubic centimeters of water, the watery solution is separated, acidified, and treated as in Example 1. 148 grams of pure diethyl-barbituric acid melting at 187 to 191° C. were produced. From the alcohol layer, 40 grams of unchanged ester are recovered by distillation. This corresponds to a conversion of 80.4% ester. 40 grams unchanged ester are recovered from the alcohol, so that the yield with reference to the ester is 94% of theory.

Example 3

80 grams sodium hydroxide are dissolved in 1200 cubic centimeters amyl alcohol and are converted into sodium amylate by distilling off the water. Then 120 grams urea and 160 grams malonic acid diethyl ester are added. This is heated for thirty minutes to 100°, and then thirty minutes to 110°, cooled off and treated further as in Example 1. The yield is about the same as in Example 1.

The sodium can be replaced equally well by potassium. In a similar manner the various barbituric acids are produced.

The invention claimed is:

1. The method of producing a barbituric acid of the formula:

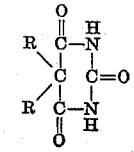

wherein R is a member of the group consisting of hydrogen and alkyl, both R's being the same, comprising heating, in the presence of an aliphatic alcohol having more than 3 carbon atoms and its alkali metal alcoholate, urea and a compound of the formula:

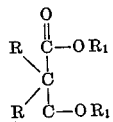

where R has the same meaning as above, and $R_1$ is a member of the group consisting of ethyl and the radical of said aliphatic alcohol, both $R_1$'s being the same.

2. Method of producing barbituric acid comprising heating malonic acid dibutyl ester and urea in the presence of alkali metal butylate and butanol.

3. Method of producing barbituric acid comprising heating diethyl-malonic acid dibutyl ester in the presence of alkali metal butylate and butanol.

4. Method of producing a barbituric acid comprising heating malonic acid diethyl ester in the presence of alkali metal amylate and amyl-alcohol.

PAUL HALBIG.
FELIX KAUFLER.